Patented Mar. 5, 1935

1,993,512

UNITED STATES PATENT OFFICE 1,993,512

TREATMENT OF HYDROCARBONS

Vladimir Ipatieff, Chicago, Ill., assignor to Universal Oil Products Company, Chicago, Ill., a corporation of Delaware No Drawing. Application July 3, 1933, Serial No. 678,932

12 Claims. (Cl. 196—10)

This invention relates more particularly to the treatment of olefinic hydrocarbons which are normally gaseous at ordinary temperatures and pressures.

Olefinic hydrocarbons with which the present invention is concerned occur along with corresponding paraffinic or saturated hydrocarbons in commercial hydrocarbon mixtures such as those encountered in the cracking of petroleum, in gas making processes and as by-products in various chemical industries. In general they are more chemically active than other classes of hydrocarbons, particularly if they contain more than one double bond or triple bonds between carbon atoms. Even when under mild catalytic influence they exhibit this reactivity in their pronounced tendency to polymerize and form substances of higher molecular weight.

Olefins occur in particularly large percentages in the fixed gases from cracking processes as well as in the gasoline boiling range fractions. The fixed gases are utilized principally as fuel, only a very small percentage of present day commercial production being subjected to processes for the recovery or utilization of the olefinic constituents. The manufacture of secondary alcohols such as iso-propyl alcohol and others by first absorbing the corresponding olefins in cracked gases in sulfuric acid and then hydrolyzing the acid esters has been undertaken to a limited extent. The olefins present in cracked hydrocarbon mixtures of gasoline boiling range are of moderately high anti-knock value, but a certain percentage of these is too highly unsaturated, and these must be removed by chemical treatment, usually with sulfuric acid, to insure proper stability of the gasoline under storage conditions.

The present process provides for more effectively utilizing the olefinic constituents of commercial hydrocarbon mixtures particularly those occurring in the gases from oil cracking processes to produce valuable derivatives therefrom and it may also be applied to individual olefins produced by special chemical methods or by fractionation of mixtures.

In one specific embodiment the invention comprises treatment of normally gaseous olefin hydrocarbons at elevated temperatures to produce polymers therefrom utilizable as constituents of motor fuel with solid contact materials or catalysts comprising phosphoric acid, a chloride or chlorides of the alkaline earth metals and spacing or carrying materials of a porous or adsorptive character.

In a further specific embodiment, oxides of the alkaline earth metals may be included in the catalyst mass.

The following table is introduced to show the general character of the compounds treated by the present process. It is not complete but is introduced as a matter of reference.

| Compounds | Formula | Boiling point ° C. |
|---|---|---|
| Ethylene | $CH_2=CH_2$ | −105 |
| Propylene | $CH_3CH=CH_2$ | −48 |
| Ethyl ethylene | $CH_3CH_2CH=CH_2$ | −5 |
| Plane-sym. Dimethyl Axial-sym. ethylene. | $CH_3 \cdot CH=CH \cdot CH_3$ | $\{$ +1 +2.5 −6 |
| Unsym. dimethyl ethylene. | $(CH_3)_2C=CH_2$ | |
| n-propyl ethylene α-amylene | $CH_3CH_2CH_2CH=CH_2$ | +39 |
| Isopropyl ethylene α-isoamylene. | $(CH_3)_2CH \cdot CH=CH_2$ | +21 |
| Sym. methyl ethyl ethylene β-amylene. | $CH_3 \cdot CH_2 \cdot CH=CH \cdot CH_3$ | +36 |
| Unsym. methyl ethyl ethylene γ-amylene. | $CH_3-CH_2 \atop CH_3 \rangle C=CH_2$ | +31 |
| Trimethyl ethylene β-isoamylene. | $(CH_3)_2C=CH \cdot CH_3$ | +36 |
| Tetramethyl ethylene | $(CH_3)_2C=C(CH_3)_2$ | +73 |

The boiling points given in the table indicate that the four carbon atom members are gaseous at ordinary temperatures and that the five carbon atom members may readily exist in minor proportions in commercial gas mixtures, such as the cracked hydrocarbon gas mixtures with which the present invention is specially concerned.

The present process is particularly directed to the production of dimers and trimers from monoolefins, particularly such olefins whose lower polymers boil at temperatures within the approximate range of commercial motor fuel, say, for example, from 100 to 400° F. It has been found that the dimers and some of the trimers of propylene, the butylenes and amylenes boil within this range and furthermore that these compounds have unusually high anti-knock characteristics. The following table shows the approximate boiling points of the dimers of propylene, butylenes, amylenes and hexylenes which will occur in appreciable quantities in the gases from oil cracking processes.

Boiling points of olefin dimers

Hexylene _____ 155° F
Octylene _____ 255° F
Decylene _____ 323° F
Dodecylene _____ 417° F Of the lower boiling and normally gaseous olefins, ethylene is the most resistant to polymerization by catalysts of the present character, but in the presence of its higher homologs it is possible that a certain amount of mixed polymers are formed.

Polymers of higher molecular weight than the di- and tri-molecular compounds are generally of too high boiling point to be used in commercial gasolines and the end products of too extensive polymerization are resinous pitchy solids which are entirely unsuitable.

The essential ingredients of the catalyst mixtures whose use constitutes the main feature of the invention are phosphoric acid and alkaline earth chlorides, the orthophosphoric acid $H_3PO_4$ being generally preferred on account of its ready availability although other acids of phosphorus may also be employed. As a rule the phosphoric acid constitutes the major portion of these essential ingredients, which are preferably incorporated with substantial amounts of spacing or carrying materials of a generally porous character or which develop a porous character under proper heat treatment, so that the effectiveness of the preferred catalysts in inducing and accelerating polymerization among gaseous olefins is particularly high.

The alkaline earth chlorides include the chlorides of calcium, magnesium, strontium and barium. These compounds may be partly changed by the action of phosporic acid to form the corresponding acid phosphates with liberation of hydrochloric acid which apparently increases the porosity of the catalyst mixture. It has been found that catalysts comprising compounds of the alkaline earth metals have a great resistance to the disintegrating influence of temperature and condensed liquids produced in the polymerization of olefinic gases, so that they may be used over long periods of time and regenerated with small losses in fines. The compounds of the different alkaline earths may be employed alternatively but each will exert its own special effect as an ingredient of the catalyst mass which is not exactly equivalent to that of the other members of the group.

The oxides of the alkaline earth metals such as lime, magnesia, strontia and baryta may be used alternatively among themselves in the catalyst mixtures with corresponding variations in results. Also different combinations of oxides and chlorides may be employed to produce catalyst masses of varying composition and polymerizing activity.

The spacing or carrying materials which may be employed may be divided roughly into three general classes:

(1) Siliceous or aluminous materials of a more or less active character which exert a variable promoting action as a component of the catalytic mass. This class includes such materials as activated alumina, the mineral bauxite, fuller's earth, bentonite and other selected clays, kieselguhr or infusorial earth, and some artificially prepared forms of silica or aluminum silicates. The influence of different materials of this character on the activity of the total catalyst mixture will depend upon their individual characteristics and their physical condition, particularly in regard to porosity, and each substance will exert its own individual effect when employed alternatively which is not exactly equivalent to the other materials which may be employed.

(2) Materials of an essentially siliceous character which have substantially no catalytic or promoting action but which function principally as carriers and in strengthening the catalyst structure. This class includes such materials as fire clays, silica fragments of varying fineness, pumice, etcetera, which may be used alternatively depending upon which is at hand in greatest quantity. These materials have substantially no reactivity with phosphoric acid and consequently do not yield phosphates.

(3) Organic materials which yield some type of carbonaceous residue on heating. This class includes such materials as cellulose, starches, sugars, glue, gelatin, flour, molasses, asphalts, tars, etcetera. They evidently function as binders in increasing the strength and resistance to disintegration of the contact masses in service.

Catalysts of the character comprised within the scope of the present invention are producible by a series of relatively simple steps comprising generally: mixing the constituents in the selected proportions, drying by heating at temperatures of approximately 180 to 220° C. and grinding and sizing the resultant product to produce particles of the desired size. When carbonaceous materials are used somewhat higher temperatures may be employed to decompose them, possibly high enough to burn out a portion of the carbon and increase the porosity. The optimum temperature of heating when employing these materials varies considerably. Good results have been obtained at 300° C. and in some instances it would appear that too high temperatures above this point have a deleterious effect. The exact maximum temperature employed in the ignition step will be to some extent a matter of trial.

Catalysts of the present character are hygroscopic to a variable extent and are best ground, sized and preserved for use out of contact with moist air.

Owing to the possibility of varying the ingredients which go to form the catalyst masses, a number of alternatives exists, each of which will have its own peculiar catalyzing and polymerizing character which will not be exactly equivalent to masses of different composition.

The polymerizing of gaseous olefins with such catalysts may be brought about under numerous combinations of temperature and pressure, though the best results for any given pure olefin or mixture of olefins such as those encountered in the gases from oil cracking plants, will usually correspond to a particular set of conditions. It is a feature of the present type of catalyst that treatments may be conducted at temperatures as high as 250° C. and superatmospheric pressures up to several hundred pounds per square inch without danger of over-polymerization resulting in the formation of heavy tar-like polymers instead of liquids of gasoline boiling range.

In using the catalysts only simple equipment is necessary such as a tube or tower in which the catalyst is placed as a filling material. The gases may be pumped up to some given pressure and pre-heated to a suitable temperature prior to passage through the catalyst mass or the catalyst chamber may be heated externally if desired. A few test runs will usually determine the best conditions of operation. For example, if the temperatures and pressures employed are such that the products exist in vapor phase, the flow of the gases through the catalyst may be upward through filled towers while if liquids are condensed, the best results may be obtained when down flows are used so that liquid does not accumulate on the surface of the catalyst.

Catalysts of the present type are characterized by their ability to polymerize olefins to produce relatively low boiling hydrocarbon polymers rather than heavy tars or pitches and by their long life due to the absence of such highly carbonaceous reaction products and also due to lack of oxidizing tendency in the phosphoric acid which constitutes the major portion thereof. In contrast to this it is notable that when employing sulfuric acid as a polymerizing agent, caution is necessary to prevent oxidation and undesirable side reactions such as ester formation and that, when employing metal halides such as aluminum chloride or zinc chloride, the tendency toward the formation of heavy polymers is very pronounced, so that it is not possible to produce more than minor amounts of desired low boiling hydrocarbons without the concurrent production of large quantities of heavy materials. Furthermore, catalysts of the present character are readily regenerated after they have been contaminated by surface carbon deposits after long periods of service by merely burning off the deposits with air or other oxidizing gas at moderate temperatures. A still further advantage resides in the fact that they are substantially of a non-corrosive character owing to the partial neutralization of the phosphoric acid and the formation of acid phosphates. The peculiar structural strength of catalyst masses of the present type has already been noted but may be mentioned again in connection with the general advantages which they possess, this being of special commercial value.

The following example of results obtained in polymerizing olefinic gases when using catalysts of the type comprised within the scope of the invention is characteristic though a number of others are available.

A catalyst was made by mixing ingredients as shown in the following table:

| | Parts by weight |
|---|---|
| 100% orthophosphoric acid | 72 |
| Magnesium chloride | 6 |
| Alumina | 2 |
| Magnesia | 5 |
| Starch | 5 |
| Kieselguhr | 10 |

The materials were intimately mixed and the plastic mixture was heated to a temperature of 250° C. for several hours. On cooling, a grayish hygroscopic solid cake was obtained which was ground and sized to produce particles of from 6 to 20 mesh in diameter.

A portion of this mass was put in an ordinary iron pipe which was wound with electrical resistance wire and commercial propylene gas of 95% purity was passed through the catalyst at a temperature of 180° C. (356° F.) under a pressure of 180 pounds per square inch. There was produced at a moderate space velocity, 10 gallons of gasoline boiling range hydrocarbons per hour per pound of catalyst, the liquid having the following characteristics:

*Properties of liquid product*

| | |
|---|---|
| Gravity ° A. P. I. | 58 |
| Initial boiling point ° F. | 100 |
| 50% over at | 275 |
| End boiling point | 450° F. |
| Color, Saybolt | 25 |
| Copper dish gums, mg/100 cc | 25 |
| Octane number | 110 |

The foregoing specification and example have shown the character of the invention and results obtainable by its use respectively but neither is to be construed in the light of imposing undue limitations thereon.

I claim as my invention:

1. A process for the treatment of normally geseous olefin hydrocarbons to convert the same into liquid hydrocarbons suitable for motor fuel, which comprises subjecting the said gaseous olefin hydrocarbons while at elevated temperature to the action of a contact agent comprising phosphoric acid and a chloride of the alkaline earth metals.

2. A process for the treatment of normally gaseous olefin hydrocarbons to convert the same into liquid hydrocarbons suitable for motor fuel, which comprises subjecting the said gaseous olefin hydrocarbons while at elevated temperature to the action of a contact agent comprising an acid of phosphorus and a chloride of the alkaline earth metals.

3. A process for the treatment of normally gaseous olefin hydrocarbons to convert the same into liquid hydrocarbons suitable for motor fuel, which comprises subjecting the said gaseous olefin hydrocarbons while at elevated temperature to the action of a contact agent comprising phosphoric acid and magnesium chloride.

4. A process for the treatment of normally gaseous olefin hydrocarbons to convert the same into liquid hydrocarbons suitable for motor fuel, which comprises subjecting the said gaseous olefin hydrocarbons while at elevated temperature to the action of a contact agent comprising phosphoric acid and a mixture of a chloride and an oxide of an alkaline earth metal.

5. A process for the treatment of normally gaseous olefin hydrocarbons to convert the same into liquid hydrocarbons suitable for motor fuel, which comprises subjecting the said gaseous olefin hydrocarbons while at elevated temperature to the action of a contact agent comprising phosphoric acid and a mixture of magnesium chloride and magnesium oxide.

6. A process for the treatment of normally gaseous olefin hydrocarbons to convert the same into liquid hydrocarbons suitable for motor fuel, which comprises subjecting the said gaseous olefin hydrocarbons while at elevated temperature to the action of a contact agent comprising phosphoric acid and calcium chloride.

7. A process for the treatment of normally gaseous olefin hydrocarbons to convert the same into liquid hydrocarbons suitable for motor fuel, which comprises subjecting the said gaseous olefin hydrocarbons while at elevated temperatures above 100° C. and below 250° C. to the action of a contact agent comprising phosphoric acid and magnesium chloride.

8. A process for the treatment of normally gaseous olefin hydrocarbons to convert the same into liquid hydrocarbons suitable for motor fuel, which comprises subjecting the said gaseous olefin hydrocarbons at polymerizing temperature to the action of a contact agent comprising a mixture of an acid of phosphorus, an adsorbent earth and a chloride of an alkaline earth metal.

9. A process for the treatment of normally gaseous olefin hydrocarbons to convert the same into liquid hydrocarbons suitable for motor fuel, which comprises subjecting the said gaseous olefin hydrocarbons at polymerizing temperature to the action of a contact agent comprising a mixture of an acid of phosphorus, fuller's earth and a chloride of an alkaline earth metal.

10. A process for the treatment of normally gaseous olefin hydrocarbons to convert the same into liquid hydrocarbons suitable for motor fuel, which comprises subjecting the said gaseous olefin hydrocarbons at polymerizing temperature to the action of a contact agent comprising a mixture of phosphoric acid, kieselguhr and magnesium chloride.

11. A process for converting normally gaseous olefins into hydrocarbon liquids which comprises polymerizing the olefins in the presence of a solid mixture of phosphoric acid and an alkaline earth metal chloride.

12. A process for converting normally gaseous olefins into hydrocarbon liquids which comprises polymerizing the olefins in the presence of a solid mixture of phosphoric acid, an alkaline earth metal chloride, and an alkaline earth metal oxide.

VLADIMIR IPATIEFF.